United States Patent
Margetts

[11] 3,811,537
[45] May 21, 1974

[54] SHOE DRUM BRAKES

[75] Inventor: Hugh Grenville Margetts, Leamington Spa, England

[73] Assignee: Girling Limited, Tyseley, Birmingham, England

[22] Filed: Sept. 22, 1972

[21] Appl. No.: 291,170

[30] Foreign Application Priority Data
Aug. 23, 1971 Great Britain.................... 44500/71
July 29, 1972 Great Britain.................... 35551/72

[52] U.S. Cl........ 188/79.5 P, 188/106 A, 188/196 P
[51] Int. Cl............................................. F16d 65/54
[58] Field of Search.... 188/79.5 P, 79.5 GT, 196 B, 188/196 BA, 106 A

[56] References Cited
UNITED STATES PATENTS
3,150,746  9/1964  Rumpf........................ 188/79.5 GT
3,308,910  3/1967  Scheffler..................... 188/79.5 GT
3,339,678  9/1967  Burnett.......................... 188/79.5 P

*Primary Examiner*—Duane A. Reger
*Attorney, Agent, or Firm*—Scrivener Parker Scrivener & Clark

[57] ABSTRACT

One part of a two-part strut of adjustable length extending between arcuate shoes of a shoe-drum brake adjacent to their actuated ends is formed by a bellcrank lever which is pivotally mounted in the other part, and one arm of the lever is engaged in a slot of limited length in a shoe web while the second arm cooperates with a toothed element rigid with said other part.

6 Claims, 7 Drawing Figures

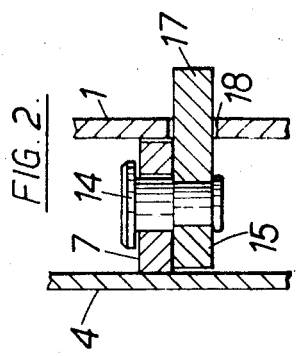
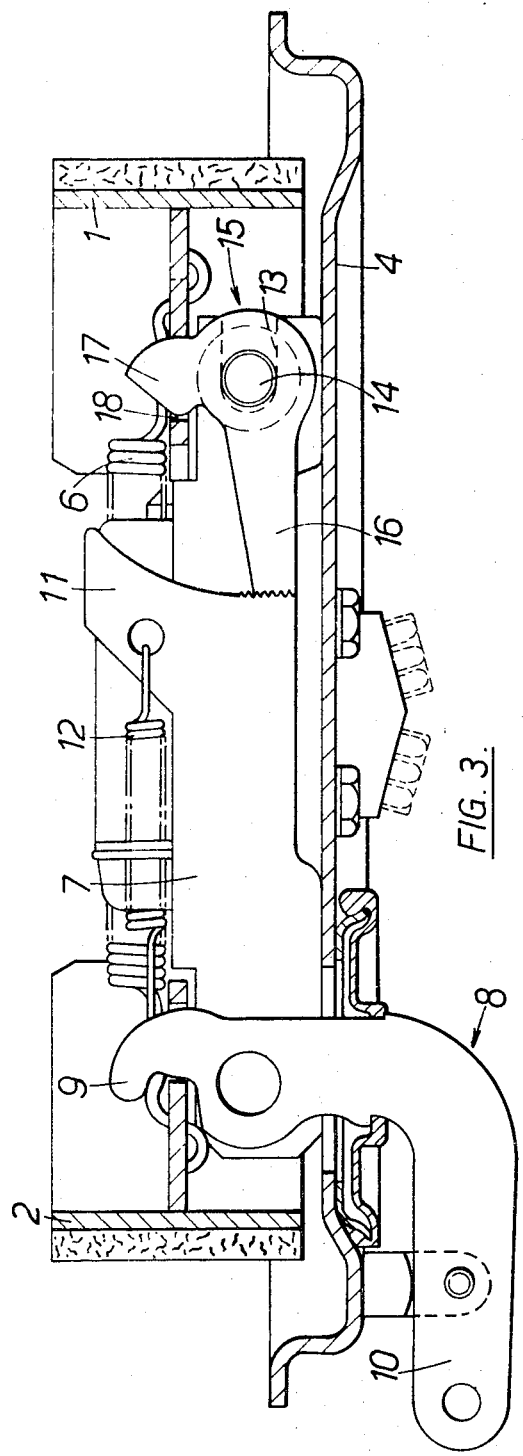

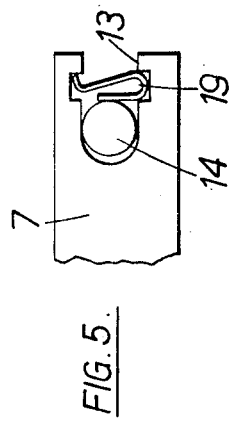
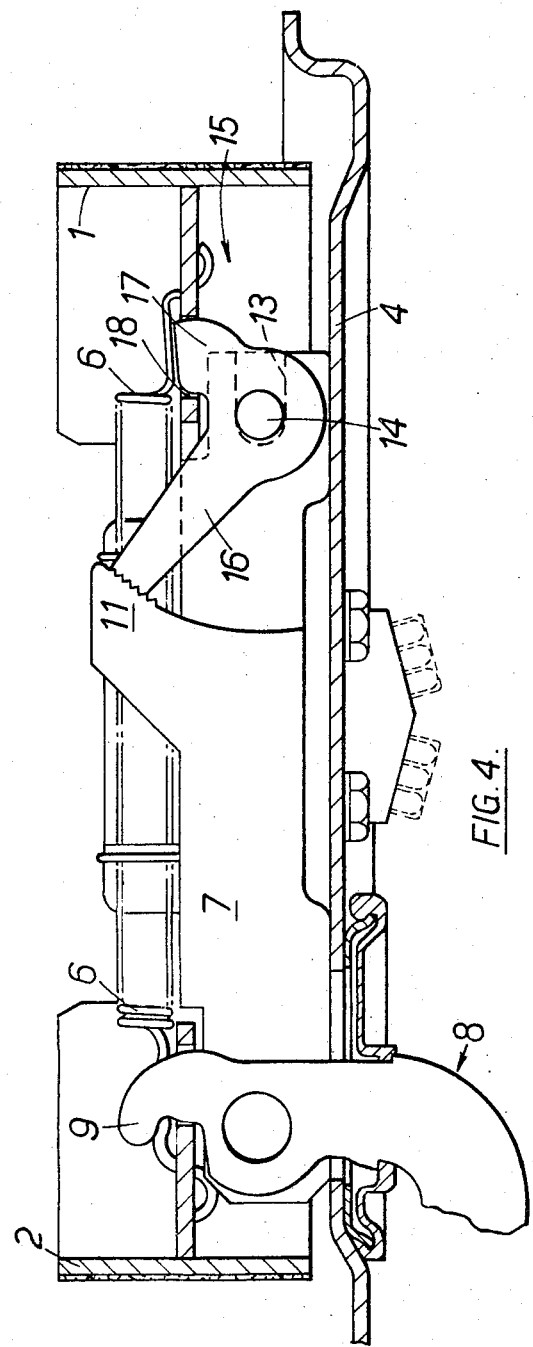

SHOE DRUM BRAKES

This invention relates to automatic adjusters for shoe-drum brakes of the kind in which arcuate shoes mounted on a stationary back-plate are adapted to be separated to bring them into engagement with a rotatable drum, and as the shoe linings wear the effective length of a two-part strut extending between the shoes is automatically increased to compensate for the wear and to maintain the clearance between the shoes and the drum substantially constant.

According to our invention an automatic adjuster for a shoe-drum brake comprises a two-part strut which extends between the shoes adjacent to their actuated ends, and of which one part is formed by a bell-crank lever which is pivotally mounted on the other part, a first arm of the lever co-operating with the web of one of the shoes and the second arm co-operating with a toothed element rigid with the said other part of the strut.

The bell-crank lever is conveniently mounted in a slot in the other part of the strut and is resiliently urged towards the toothed element on said other part, the second arm of the lever being disengaged from the toothed element by outward movement of the shoe beyond a predetermined amount so that the lever can pivot and its second arm can take up a fresh position relative to the toothed element when the brake is released whereby the effective length of the strut is automatically increased.

The part of the strut carrying the toothed element may conveniently carry means for applying the brake mechanically from a hand lever for parking or emergency use and this means may provide the engagement between this part of the strut and the second shoe.

An automatic adjuster according to this invention may be used with a brake in which hydraulic actuating means are disposed between one pair of adjacent shoe ends, the other pair of shoe ends being anchored to the base plate, and in which means for mechanically applying the brake connect the strut to the other shoe.

Conveniently the lever may be so arranged and mounted so that the load between the two sets of teeth is substantially compressive, there being only small shear forces acting on the teeth.

A brake embodying an automatic adjuster according to the invention and a modification are illustrated by way of example in the accompanying drawings, in which:

FIG. 2 is a section on the lines A—A of FIG. 1,

FIG. 3 is a section on the lines B—B of FIG. 1, the shoes shown with new friction linings, FIG. 4 is a section similar to FIG. 3, the shoes shown with worn linings, FIG. 5 is a detail of FIG. 3.

Figure 1:
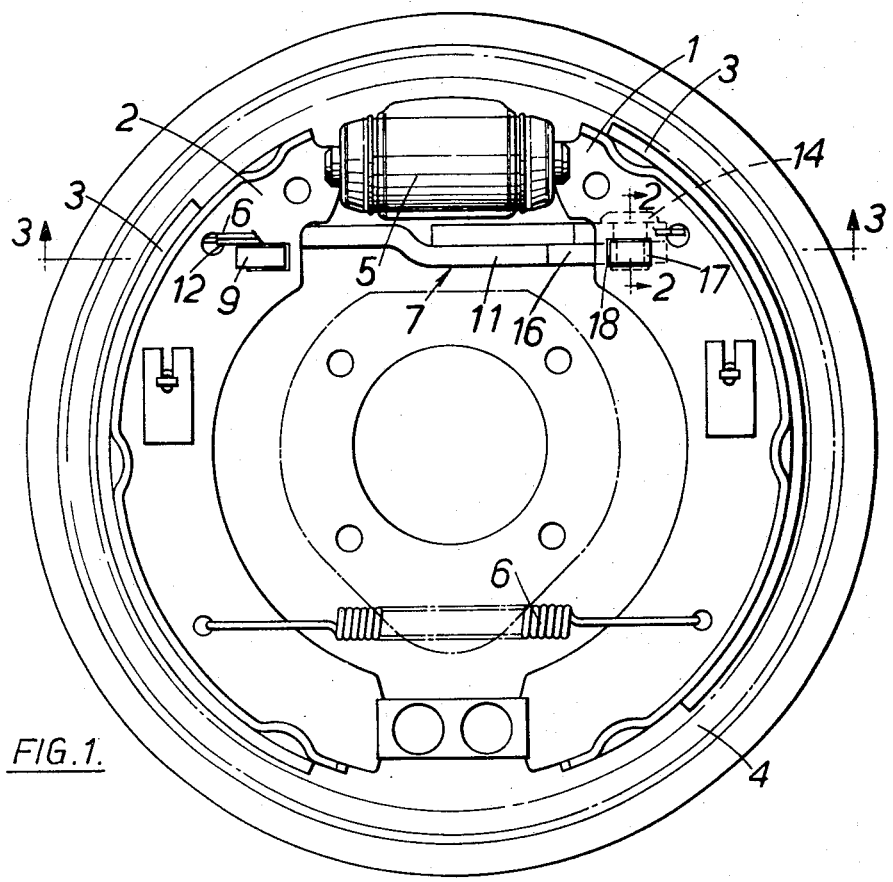
FIG. 1 is an end view of the brake.

In the brake illustrated two arcuate brake shoes 1, 2 carrying friction linings 3 are mounted on a stationary back plate 4 within a rotatable drum (not shown). Actuating means comprising a double-ended hydraulic cylinder 5 is adapted to apply the brake by separating a pair of adjacent ends of the shoes 1, 2, the other pair of adjacent ends being anchored to the back-plate 4.

The shoes 1, 2 are biassed towards each other by return springs 6.

A plate strut 7 extends across between the shoes adjacent to the actuator 5, a substantial part of one longitudinal edge of the strut 7 being in sliding contact with the back-plate 4 and the end portions of the opposite edge lying on the inner sides of the webs of the two shoes. A bell-crank lever 8 is pivotally mounted on one end of the strut 7, one arm 9 engaging in an opening in the web of shoe 2, and the other arm 10 is adapted to be connected to a hand lever (not shown).

Between its ends and on the side adjacent the actuator 5 the strut 7 is formed with an arcuate toothed element 11 which projects out beyond the edge adjacent the shoe webs. As shown in FIG. 1 the strut 7 is fabricated from two plates, the element 11 being integral with one of the plates. A retaining spring 12 acts between the toothed element 11 and the web of shoe 2 to keep the strut/hand brake lever assembly in contact with shoe 2.

The end of the strut 7 adjacent shoe 1 is provided with a slot 13 in which is located a pivot pin 14 for a bell-crank lever 15. The pin 14 is headed at both ends to retain the lever 15 in contact with the strut 7. The first arm 16 of the bell-crank lever 15 is directed towards the toothed element 11 and has teeth co-operating with the teeth of element 11. The second arm 17 of the bell-crank lever 15 projects through an opening 18 in the web of shoe 1. The side of the second arm 17 adjacent the rim of shoe 1 is provided with a cam surface for engaging with the edge of opening 18. In the "off" position of the brake there is a small clearance between arm 17 and the opposite edge of opening 18. The bell-crank lever 15 is biassed to pivot the first arm 16 towards the projecting portion of toothed element 11. One possible method of biassing the lever in this way is by means of a spring 19 as shown in FIG. 5.

In the hydraulic operation of the brake the ends of the shoes 1 and 2 are separated by the actuator 5, the strut 7 and hand brake lever 8 remaining in contact with shoe 2 under the influence of spring 12. The shoe travels outwardly until the clearance is taken up between the edge of opening 18 and arm 17 of bell-crank lever 15. Shoe 1 then carries lever 15 towards the open end of slot 13 until the teeth on arm 16 disengage from the teeth of the element 11. If the movement of the shoe 1 is greater than the sum of these two clearances the lever 15 pivots so that arm 17 moves along the arcuate element 11 under the action of its biassing means, say spring 19, so that a new portion of the cam surface of the arm 17 is in contact with the edge of opening 18. If this movement is sufficient to bring a new tooth on element 11 into co-operation with arm 16, strut 7 is effectively lengthened when the brake is released, engagement between shoe 1 and the cam surface of arm 17 preventing the shoe from returning to its original position.

Thus the separation of the shoes can be adjusted in increments depending on the pitch of the teeth on element 11 and the ratio between the effective lengths of arms 15 and 17 of the bell-crank lever 15.

On mechanical operation of the brake arm 9 of lever 8 acts on shoe 2 and the reaction on strut 7 causes the arm 17 of lever 15 to act on shoe 1. In this operation the loading between the teeth of element 11 and arm 16 is substantially all compressive, tending to force the teeth into engagement.

Figure 6:
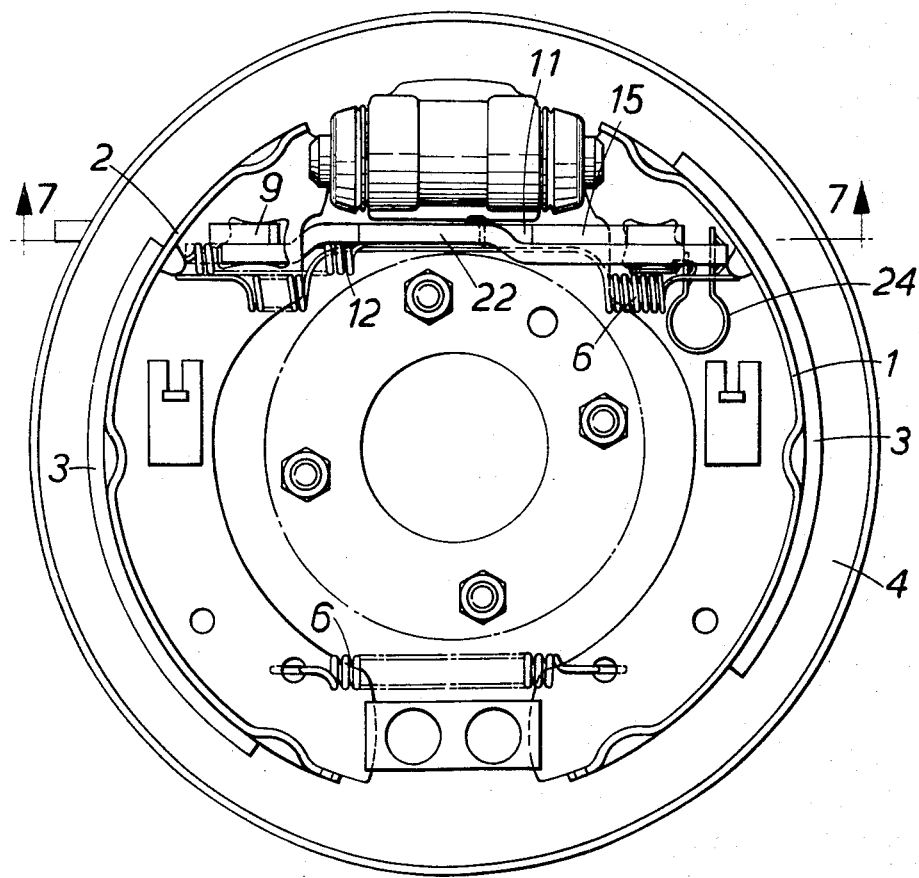
FIG. 6 is an end view similar to FIG. 1 of a modified arrangement.
Figure 7:
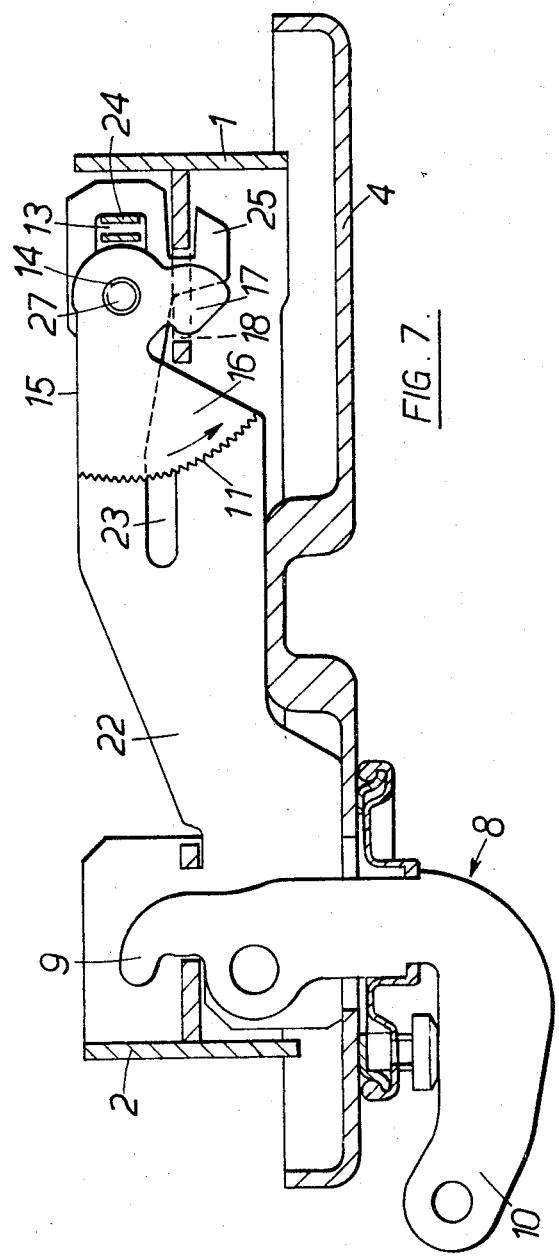
FIG. 7 is a section on the line 7—7 of FIG. 6.

The modification shown in FIGS. 6 and 7 is substantially the same in construction and operation as the embodiment described above and the same reference numerals have been applied to the corresponding parts.

However, in the modification, the fabricated plate strut 7 is replaced by a one-piece strut 22. This is cranked, as shown more particularly in FIG. 6, the central part being displaced outwardly from the ends. A longitudinal slot 23 is formed in the strut and on one side of the slot the metal is continued in the plane of the central part and this part has an arcuate toothed edge and forms the toothed element 11 for co-operation with the arm 16 of the bell-crank lever 15. That lever is biassed by a hair-pin spring 24 which is the equivalent of the spring 19 shown in FIG. 5.

To prevent the strut from tilting, owing to a part of the force acting on it being oblique with respect to the back plate when the brake is applied mechanically, the end of the strut adjacent the shoe 1 may be formed with a tongue 25 passing through a slot in the shoe web but this is not essential.

As the strut is made in one piece instead of from two pieces welded together the teeth on the strut can be made with a high degree of accuracy and there is no risk of their being deformed when the strut becomes hot.

It will be appreciated from FIG. 6 that as the shoe linings wear the arm of the bell-crank lever swings into the space between the shoe web and the back plate when there is ample room for it.

The adjuster of this invention can be applied to other types of shoe drum brake with or without means for applying the brake mechanically. The adjuster is compact since it is substantially contained in the space between the webs of the shoes and the back plate and is little greater in depth than the thickness of the strut. It is also economical to manufacture and assemble.

I claim:

1. An automatic adjuster for a shoe-drum brake in which arcuate shoes mounted in a stationary back-plate are adapted to be separated at one end to bring them into engagement with a rotatable drum; said adjuster comprising an extensible strut having a first part having operative engagement with one of the shoes, a toothed element rigid with said first part, said strut having a second part comprising a bell-crank lever having a pivot mounted on the first part, said pivot being axially moveable relative to said first part, one arm of said bell crank having an operative connection with said second shoe, resilient means urging the other arm of said bell-crank lever into releasable engagement with said toothed element, said strut being constructed and arranged that when the separation of the shoes during brake application exceeds a predetermined value due to lining wear, the parts of the strut are moved apart until said toothed element and said other arm are disengaged and said bell-crank lever may pivot to a position wherein said other arm re-engages the toothed element in the new position when the brake is released to increase the effective length of the strut.

2. An automatic adjuster for a shoe-drum brake as in claim 1 wherein the bell-crank lever pivot is mounted in a slot in said other part.

3. An automatic adjuster for a shoe-drum brake as in claim 1 wherein the operative connection of the first arm of the bell-crank lever with the second shoe comprises a slot of limited length in a web of the shoe with which it co-operates, and a portion of the arm is formed as a cam which, in the release position of the brake, engages with the radially outer end of the slot to define the adjusted position of the shoe.

4. An automatic adjuster for a shoe-drum brake as in claim 1 wherein the free end of the second arm of the bell-crank lever is of arcuate form and is provided with teeth complementary to those on the toothed element on the other part of the strut which is of complementary arcuate form.

5. An automatic adjuster for a shoe-drum brake as in claim 1 wherein the strut incorporates means for applying the brake mechanically for parking or emergency braking.

6. An automatic adjuster for a shoe-drum brake as in claim 1 wherein the strut incorporates a manually operable lever adapted to engage one shoe and by reaction on this strut to apply the other shoe, the load being applied to said other shoe through and in alighnment with the toothed engagement between said bell-crank lever and said toothed element.

* * * * *